United States Patent
Brunnert et al.

(10) Patent No.: US 7,324,881 B2
(45) Date of Patent: Jan. 29, 2008

(54) TRANSFORMATION APPARATUS IN AN AGRICULTURAL MACHINE

(75) Inventors: Andreas Brunnert, Delbrueck (DE); Jochen Huster, Guetersloh (DE); Norbert Diekhans, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 337 days.

(21) Appl. No.: 10/953,843

(22) Filed: Sep. 29, 2004

(65) Prior Publication Data
US 2005/0090960 A1 Apr. 28, 2005

(30) Foreign Application Priority Data
Oct. 2, 2003 (DE) ................. 103 46 457

(51) Int. Cl.
*G01C 22/00* (2006.01)
(52) U.S. Cl. .......................... 701/50; 701/23
(58) Field of Classification Search .............. 701/1, 701/23, 25, 200, 213–214, 223, 50, 211; 180/167; 348/113, 116, 118–120; 56/10.2 F, 56/1, 10.2 R
See application file for complete search history.

(56) References Cited

U.S. PATENT DOCUMENTS

| | | | | |
|---|---|---|---|---|
| 5,509,486 A | * | 4/1996 | Anderson | 172/6 |
| 6,278,918 B1 | * | 8/2001 | Dickson et al. | 701/23 |
| 6,697,724 B2 | | 2/2004 | Beck | |
| 6,819,780 B2 | * | 11/2004 | Benson et al. | 382/104 |
| 6,990,399 B2 | * | 1/2006 | Hrazdera et al. | 701/50 |

FOREIGN PATENT DOCUMENTS

EP 1 266 553 A2 12/2002

* cited by examiner

*Primary Examiner*—Yonel Beaulieu
(74) *Attorney, Agent, or Firm*—Michael J. Striker

(57) ABSTRACT

Transformation of differently structured signals of different track guidance systems for automatic control of a steering device in an agricultural working machine includes supplying the differently structured signals of different track guidance systems to a transformation device, and generating by the transformation device from each of the different structured signals a uniform output signal to be used for automatically controlling a steering device of an agricultural working machine.

14 Claims, 2 Drawing Sheets

TRANSFORMATION APPARATUS IN AN AGRICULTURAL MACHINE

BACKGROUND OF THE INVENTION

The present invention relates to a method of and an apparatus for transformation of different structured signals of different track guidance systems for automatic control of a steering device in agricultural working machine.

Different track guidance systems for agricultural machines are offered by different manufacturers. These track guidance systems are partially integrated as fixed components in an agricultural working machine. On the other hand, not all land machines are designed with track guidance systems, in particular older models belong to this group. There is therefore a practical requirement, to equip land machines without track guidance systems with a freely selectable track guidance system as well as to complete the track guidance systems available in the land machines by further track guidance systems for increasing the accuracy of the track guidance.

European patent document EP 1 266 553 A2 discloses a device for automatic steering of an agricultural working vehicle, with a control device that receives a first position signal and a second position signal, as well as a nominal path information which defines the covered path. In addition, from the first and second position signals, a selection can be made to determine the most accurate signal. Due to the determined data, an automatic steering of the agricultural working vehicle is performed. As a positioning system, satellite signals of the global positioning system are utilized. A further positions signal is recovered by the utilization of the laser scanning sensors. The laser scanning sensors determine the relative position of the crop stand edge and orient the land machine in correspondence therewith.

The device for steering an agricultural working machine disclosed in the patent document EP 1 266 553 A2 provides however at least two available track guidance systems. The disadvantage of this solution is in particular its high costs which must be invested by the purchaser of these two different systems. In particular, the GPS supported track guidance system is a very cost-intense system. The possibility of uniting of the older systems with the control unit is also not provided, so that the disclosed system can not be used for all land machine models. The post-equipment of the available system can be performed only by a complete exchange and installation of the correspondingly required software. This expensive post-equipment requires at least an intervention in the available steering control system on each land machine to be post-equipped.

SUMMARY OF THE INVENTION

Accordingly, it is an object of the present invention to provide a method of and an apparatus for transformation of different structural signals of different track guidance systems, which avoid the disadvantages of the prior art and provide a plurality of possibilities to use different track guidance systems for automatic steering of an agricultural working machine.

In keeping with these objects and with others which will become apparent hereinafter, one feature of the present invention resides, briefly stated, in a method of transformation of differently structured signals of different track guidance systems for automatic control of a steering device in an agricultural working machine, comprising the steps of supplying the differently structured signals of different track guidance systems to a transformation device, and generating by the transformation device from each of said different structured signals a uniform output signal to be used for automatically controlling a steering device of an agricultural working machine.

Another feature of the present invention resides, briefly stated, in an apparatus for transformation of different structured signals of different track guidance systems for automatic control of a steering device of an agricultural working machine, comprising a transformation device associatable with different track guidance systems and formed so as to receive signals from the different track guidance systems and to generate a uniform output signal for automatically controlling a steering device of an agricultural working machine.

Since in accordance with the present invention differently structured output signals of different track guidance systems are supplied to a single transformation device, and the transformation device generates from the differently structured input signals a uniform output signal, track guidance systems of different designs can be used on all arbitrary agricultural working machines. In particular, in new track guidance systems can be integrated in land machines without performing an expensive system change.

Due to the cooperation of several systems in a single transformation device, in addition an increased wiring expense can be prevented. In particular, the interference irradiations and interference emission caused by conductors can be reduced. Since in general less plugs and connecting points are needed, a higher anti-failure safety of the system is achieved. The utilization of less conducting materials also reduces the costs and saves space. In accordance with the present invention also a contactless connection between the systems, the transformation device and/or the steering device can be provided.

Furthermore, due to the transformation device, a new possibility of the system structure is provided. In particular, the transformation device can be integrated in an existing system and requires no new purchase of further control devices.

Also, operational potential is used better, since the driver of the agricultural working machine every time has the selection of a track guidance system which is the most suitable for the corresponding harvesting application of the agricultural machine, between several track guidance systems.

Also, the diagnostic possibility is improved, since in accordance with the present invention all systems connected to the transformation device are monitored with respect to one another, and in the event of a failing operation of one system, a replacement system is automatically provided.

Finally, further systems can be connected to the transformation device, which generate the harvest-specific and/or machine-specific parameters. In particular, data, such as for example the machine tendency which in some cases can provide action on the track guidance associated with the transformation device, can be converted and introduced as a correction parameter in the steering of the land machine.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
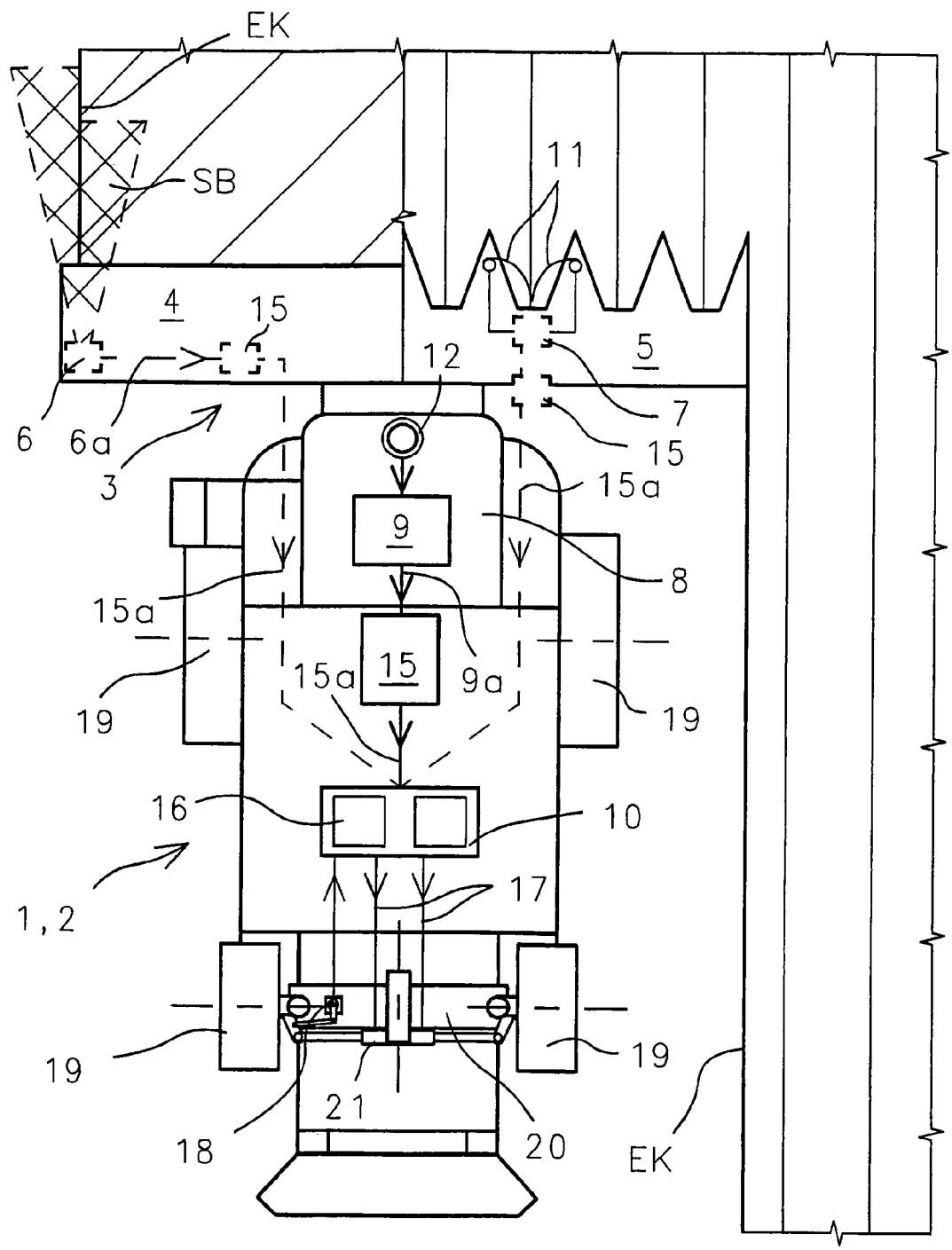
FIG. 1 is a view schematically showing a self-propelled combine harvester in a plane view with an inventive transformation device.

An agricultural working machine 1 formed as a self-propelled combine harvester 2 is shown on a plan view in FIG. 1. A front attachment 3 which is arranged at a front side on the combine harvester 2 can be formed as a grain cutter bar 4 or a corn picker 5. The use of the different attachments 4, 5 is dependent on the corresponding type of the crop.

Different track guidance systems are arranged on the combine harvester 2. In the schematic illustration, a generally known laser track guidance system 6 is provided on the grain cutterbar 4, a generally known corn sensor 7 is provided on the corn picker 5, and a GPS controlled track guidance system 9 is integrated in the driver cabin 8.

The crop stand edge EK is scanned with the laser-controlled track guidance system 6. This is performed by position beams generated by a laser device, which determine a scann region SB and pivotally scan the crop stand edge EK. For determination of the crop stand edge EK, reflected position beams are detected for evaluation of the laser-controlled track guidance system 6. Based on the determined values, a signal for a steering device 10 is generated, whereby the combine harvester 2 is automatically oriented depending on the crop stand edge EK.

The crop sensor 7 arranged on the corn picker 5 contacts the crop stand and generates a signal for the steering device 10, that is supplied the steering of the combine harvester 2 based on the crop standing on the field.

By means of the global positioning system GPS the position of the combine harvester 2 on the field is calculated, when the instantaneous position of the combine harvester 2 and the field data such as width, length and position of the concrete field are known. When these data are available, the position of the combine harvester 2 on the corresponding field is determined, and depending on it the traveling route is calculated independently from the crop stand. The satellite signals generated by the GPS are sent to a GPS antenna 12 arranged on the driver cabin 8, which further supplies these input signals to a track guidance system. Based on the actual position and the previously planned traveling route, a signal is further supplied to the steering device 10, and thereby the steering axle 20 is controlled by a steering cylinder 21.

Since these different track guidance systems 6, 7, 9 are used on different land machines or partially are not components of the agricultural machines, it is advisable to provide the land machines with at least one track guidance system or with already existing guiding systems, with at least one further track guidance system. This has the advantage that some disadvantages which are inherent for the corresponding systems, can be compensated by an additional system. In particular, a GPS-dependent track guidance system has the disadvantage that the track guidance is completely independent from the actually available crop stand. The system therefore continue the harvesting travel also when no crop stand, for example because of poor weather conditions, is provided. Furthermore, outer environmental conditions, such as overcast sky or dense tree stand near the field that lead to a shading of the satellites, affect the operation of the GPS controlled track guidance system.

The completion of the available track guidance system is provided by a transformation device 15. The transformation device 15 receives the input signals of the corresponding track guidance systems 6, 7, 9. From the differently structured input signals 6a, 7a, 9a, the transformation device 15 transforms a uniform output signal 15a. This uniform output signal 15a is supplied to a steering device 10. In the steering device 10 the uniform input signal 15a is evaluated by a computing unit 16 and produces an output signal 17 for automatic steering of the combine harvester 2.

For controlling the actual position of the wheels, a wheel angle transducer 18 can be used, which indicates the actual position of the tires 19 to the computing unit 16. The transformation device 15, as shown by a broken line, can be associated with each track guidance system 6, 7, 9 or with all track guidance systems 6, 7, 9.

Figure 2:
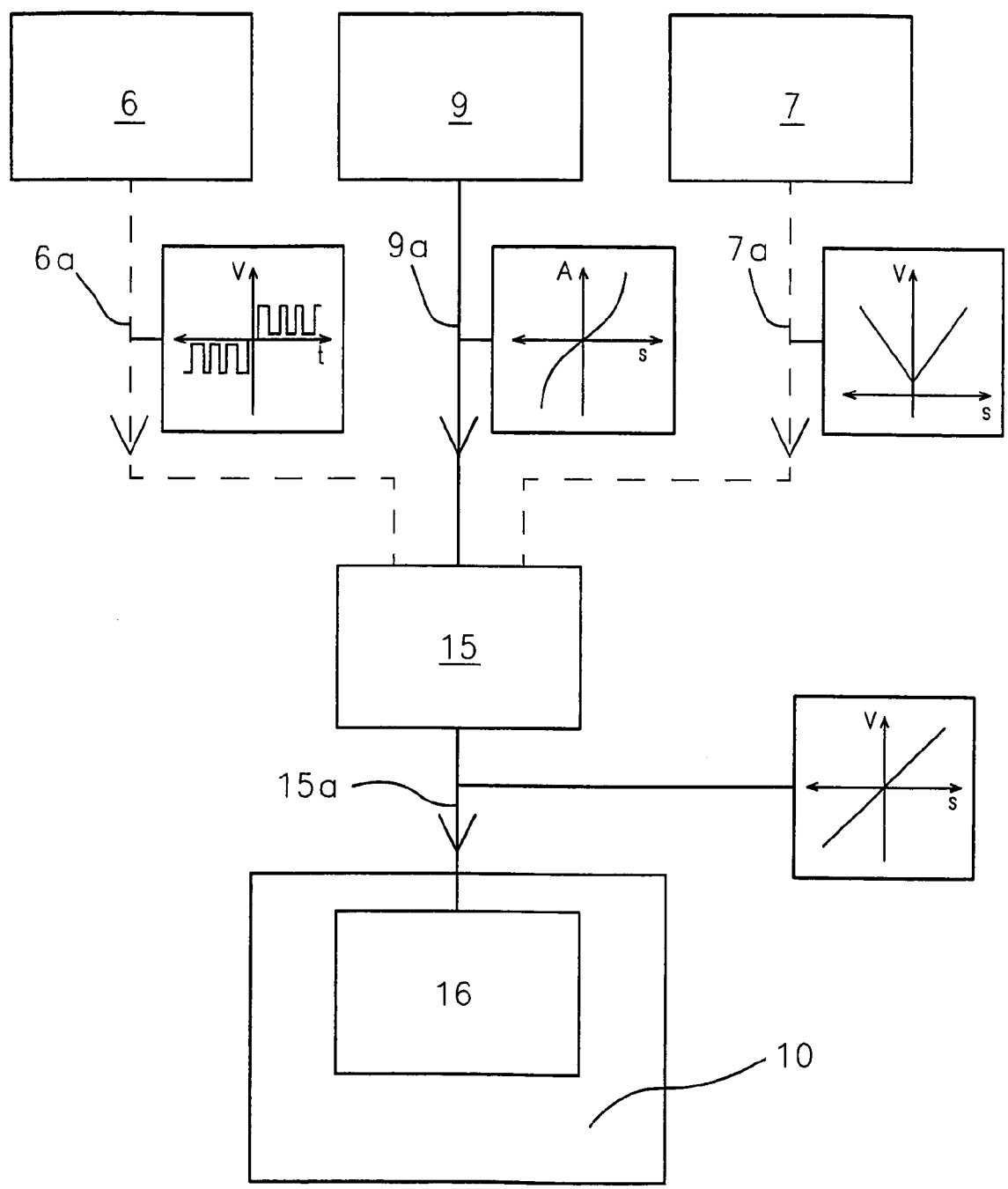
FIG. 2 is a view showing a flow diagram of a method in accordance with the present invention.

FIG. 2 shows a flow diagram of the inventive method.

As for example not locked forms of track guidance systems, the GPS-based track guidance system 9, the laser-control track guidance system 6, and the mechanical key-controlled track guidance systems 7 are provided as basic track guidance systems. The different track guidance systems 6, 7, 9 generate differently structured output signals 6a, 7a, 9a. The differently structured output signals 6a, 7a, 9a are schematically shown by diagrams 9a, 6a, 7a associated with the corresponding track guidance systems 6, 7, 9. In accordance with the present invention, the track guidance systems 6, 7, 9 are not limited only to the available systems, but also can be expanded to any number of track guidance systems.

The different signals 6a, 7a, 9a are supplied to the inventive transformation device 15. The transformation device 15 processes the differently structured input signals 9a, 6a, 7a and generate from the differently structured input signals 9a, 6a, 7a a uniform output signal 15a. This uniform output signal 15a is shown by the diagram. The uniform output signal 15a is supplied to a computing unit 16, by which from the output signal 15a, the steering of the combine harvester 2 is controlled.

Because of bringing together of different structured output signals 9a, 6a, 7a of different track guidance systems 6, 7, 9 in the transformation device 15, system-foreign or external signals are converted into a uniform signal and utilized by an available steering device 10 for orientation of the combine harvester 2.

In the practice a track guidance system can utilize same operational principles of several manufacturers or suppliers. Since these track guidance systems send different signals, in accordance with the present invention an operation principle-specific transformation device 15 can be used, that transforms the different input signals of the track guidance systems of different manufacturers based on the same operational principle, in the uniform output signal.

Also, the transformation device 15 can be associated with further not illustrated systems for determination of different harvest parameter or machine parameters, such as for example an inclination of the agricultural machine 1 on the field, whose signals are detected in the sense of the present invention and converted, so that further track guidance inaccuracies can be compensated.

The inventive method and the inventive apparatus can be used not only on combine harvesters, but on agricultural working machines of any type.

It will be understood that each of the elements described above, or two or more together, may also find a useful application in other types of methods and constructions differing from the types described above.

While the invention has been illustrated and described as embodied in transformation apparatus in an agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method of transformation of differently structured signals of different track guidance systems for automatic control of a steering device in an agricultural working machine, comprising the steps of supplying the differently structured signals of different track guidance systems to a transformation device, and generating by the transformation device from each of the different structured signals a uniform output signal configured for automatically controlling the steering device of all arbitrary agricultural working machines with the use of the thusly generated uniform output signal without a system change of the steering device.

2. A method as defined in claim 1; and further comprising supplying the uniform output signal to a common steering device.

3. A method as defined in claim 1; and further comprising converting the signal of one of the track guidance systems by the transformation device into the uniform output signal and supplying the uniform output signal to an automatic steering device; and using the uniform output signal for an automatic track guidance.

4. A method as defined in claim 1, wherein said supplying of signals to the transformation device includes supplying of signals from the track guidance systems which include at least two differently structured track guidance systems.

5. A method as defined in claim 1, wherein said supplying includes supplying the signals of the different track guidance systems which operate in accordance with different operational principles.

6. A method as defined in claim 1; and further using the track guidance systems which operate on a principle selected from the group consisting of optical, acoustic, visual, mechanical, ultrasonic, and infrared controlled principles.

7. A method as defined in claim 1; and further comprising using the track guidance systems which operate in accordance with a principle selected from the group consisting of a laser-controlled principle, a GPS controlled principle and a mechanically-controlled principle.

8. A method as defined in claim 1; and further comprising supplying to the transformation device further signals, converting the further signals by the transformation device, and transmitting the converted further signals to the steering device.

9. A method as defined in claim 8; and further comprising selecting the further signals from a group consisting of a harvest-specific parameter and a machine-specific parameter.

10. An apparatus for transformation of differently structured signals of different track guidance systems for automatic control of a steering device of an agricultural working machine, the apparatus comprising a transformation device associatable with different track guidance systems, said transformation device being formed so as to receive signals from the different track guidance systems and to generate a uniform output signal configured for automatically controlling the steering device of all arbitrary agricultural working machines with the use of the thusly generated uniform output signal without a system change of the steering device.

11. An apparatus as defined in claim 10, wherein said transformation device is formed so that it produces the uniform output signal such that the uniform output signal is supplied to the steering device that recognizes the output signal as a steering signal for the steering device.

12. An apparatus as defined in claim 10, wherein the transformation device is formed so that one such transformation device is associated with the track guidance systems of same operational principles.

13. A method of automatically controlling a steering device in an agricultural working machine, comprising the steps of providing different track guidance systems; generating by the different track guiding systems differently structured signals; supplying the differently structured signals generated by the different track guidance systems to a transformation device, generating by the transformation device from each of the different structured signals of the different track guidance systems a uniform output signal; and automatically controlling the steering device of all arbitrary agricultural working machines with the use of the thusly generated uniform output signal without a system change of the steering device.

14. An apparatus for automatically controlling a steering device in an agricultural working machine, comprising different track guidance systems generating differently structured signals; a transformation device to which the differently structured signals generated by the different track guidance systems are supplied and which generates from each of the different structured signals of the different track guidance systems a uniform output signal configured for automatically controlling the steering device of all arbitrary agricultural working machines with the use of the thusly generated uniform output signal without a system change of the steering device.

* * * * *